United States Patent Office 3,130,128
Patented Apr. 21, 1964

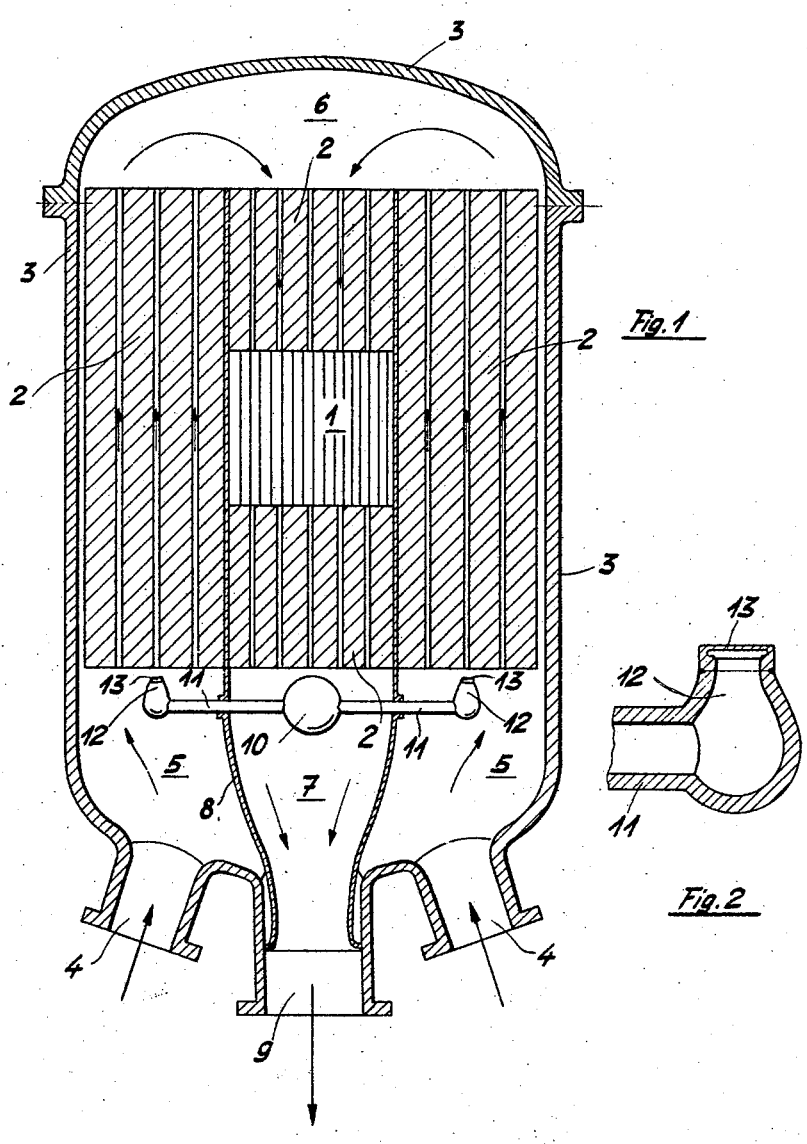

3,130,128
SAFETY DEVICE FOR NEUTRONIC REACTOR
Werner Spillmann, Kilchberg, Zurich, Switzerland, assignor to Escher Wyss Aktiengesellschaft, Zurich, Switzerland, a corporation of Switzerland
Filed July 21, 1960, Ser. No. 44,333
Claims priority, application Switzerland Sept. 7, 1959
2 Claims. (Cl. 176—22)

This invention relates to a device for the automatic stopping of a neutronic reactor through which flows a coolant.

In a known device for stopping a nuclear reactor, a vessel is provided containing a neutron-absorbent gas under pressure. The vessel has an outlet orifice closed by a plug which, when a predetermined maximum temperature is exceeded, melts and releases neutron-absorbent gas into the reactor. The reactivity of the reactor is thus so strongly reduced that generation of heat ceases and further rise in temperature in the reactor is avoided.

In this device, the neutron-absorbent gas is admitted to the reactor at the point where is situated the plug which melts on the predetermined temperature being reached. If a coolant circulates through the reactor, the maximum temperature occurs at the exit of the coolant from the reactor. If the vessel with the said fusible plug, however, is positioned at that place, so that on the melting point being reached, the neutron-absorbent gas escapes into the outlet space of the coolant, the disadvantage arises that this gas is at first carried away by the coolant and reaches the operative region of the reactor only when the circulating coolant returns to the latter. The effect is thus delayed, so that it is possible that in the interim, despite the correct timing of the operation of the device, the temperature in the reactor rises inadmissibly. This danger arises in particular when the coolant of the reactor is itself used as working medium of a thermal power plant, so that it returns to the reactor only when it has passed through the various machines and apparatus.

It is the object of the invention to obviate this disadvantage. In a device for the automatic stopping of a nuclear reactor through which flows a coolant, in which, in the event of overheating of the reactor, a neutron-absorbent gas is admitted to the reactor from a vessel, this object is achieved according to the invention by the fact that the vessel containing the neutron-absorbent gas is arranged in the outlet space of the coolant and is provided with at least one pipe opening into the inlet space of the coolant, and that the mouth of this pipe has a pressure-responsive closure member which opens automatically when a predetermined gas pressure in the vessel is exceeded.

The drawing shows in simplified form a constructional example of the invention.

FIG. 1 shows an axial longitudinal section through an atomic nuclear reactor with the built-in device, and FIG. 2 shows a part section through the device on a larger scale.

A gas-cooled reactor with reactor core 1 and reflector 2 is built into a pressure-resistant cylindrical housing 3. The reactor fuel, i.e. fissionable material, is accommodated in the core 1. A gaseous coolant, for example helium, which at the same time can be used as working medium for a thermal power plant not shown operated by the heat generated in the reactor, passes under pressure through supply connections 4 into an annular space 5 left in the housing 3 below the reflector 2.

This annular space forms the inlet space for the coolant supplied to the reactor. From this space, the coolant flows axially through the reflector 2, enters an upper space 6 of the housing, where it is deflected and returned in the axial direction through the inner part of the reflector 2 and the reactor core 1. On its passage through the reflector 2 and the reactor core 1, the cooling gas absorbs heat. It then passes into a central outlet space 7, which is surrounded by the annular space 5 and is separated from the latter by a tubular wall 8. The cooling gas finally leaves the reactor housing 3 through a central discharge connection 9.

Built into the outlet space 7, in which the cooling has reached its highest temperature, is a spherical vessel 10, which contains a neutron-absorbent gas, for example boron fluoride ($BF_3$). This vessel is provided with two pipes 11, which open into the inlet space 5 of the cooling gas. These pipes 11 have mouths 12 which are directed in the space 5 towards the reflector 2 and which are closed by plates 13. The closure plates 13 are so designed that they rupture on a predetermined gas pressure being reached in the pipes 11 or in the vessel 10, allowing the neutron-absorbent gas to escape.

The device operates as follows:

In the event of excessive heat generation in the reactor, the temperature of the cooling gas entering the space 7 rises. Through the wall of the vessel 10 surrounded by this gas, heat is now given off to the neutron-absorbent gas contained therein. The temperature of this gas also rises, and since the latter is in an enclosed space, the gas pressure in the vessel 10 and pipes 11 also rises correspondingly. When this pressure exceeds the above-mentioned predetermined value, which is to be adjusted when the temperature of the discharging cooling gas reaches the value at which the device is to operate, the closure plates 13 are ruptured. The closure thus opens automatically. The neutron-absorbent gas escapes into the space 5 and enters the reactor directly with the cold cooling gas entering through the connections 4. The reactivity of the reactor is thus reduced in a very short time to a value at which the generation of heat ceases.

The effect described would also be obtained if the inlet space and outlet space of the cooling gas were not situated close to each other, that is to say, if for example the cooling gas entered the space 6 directly and the entire space 5, 7, without the partition 8, were to serve as outlet space. The openings 12 would then have to be provided in space 7 with suitable extension of the pipes 11.

What is claimed is:

1. In a neutronic reactor comprising a housing having a supply connection and a discharge connection for a gaseous cooling medium under pressure, an active portion containing fissionable material arranged within said housing, and means defining within said housing an inlet space communicating with said supply connection and an outlet space communicating with said discharge connection and a heat exchange flow path for said gaseous cooling medium leading from said inlet space through said active portion to said outlet space: a safety device consisting of a pressure vessel containing a neutron-absorbent gas, arranged within said coolant outlet space in heat exchange with the discharging gaseous cooling medium, and at least one pipe issuing from said pressure vessel and having a mouth opening into said coolant inlet space, a direct pressure-responsive closure plate in said mouth designed to rupture when the pressure of the neutron-absorbent gas in the vessel exceeds the pressure which is obtained at the permitted maximum outlet temperature of the gaseous cooling medium.

2. In a neutronic reactor comprising a generally cylindrical housing, an active reactor core containing fissionable material and a reflector surrounding said core, arranged within said housing so as to leave an annular inlet space and a central outlet space for a cooling gas under pressure at the bottom of said housing; partition means between said inlet and outlet space; means defining a heat exchange flow path for the cooling gas leading from said annular inlet space through said reflector and said reactor core to said central outlet space; at least one supply connection communicating with the inlet space for the supply of the cooling gas; and a central discharge connection communicating with the outlet space for the discharge of the cooling gas: a safety device consisting of a pressure vessel containing a neutron-absorbent gas arranged within said outlet space, and at least one pipe issuing from said vessel and having a mouth located in said inlet space and directed into the annular inlet space for the cooling gas and provided with a direct pressure-responsive closure member designed to open automatically, when the pressure of the neutron-absorbent gas in the vessel exceeds the pressure which is obtained at the permitted maximum temperature of the outlet cooling gas.

References Cited in the file of this patent

UNITED STATES PATENTS

| | | |
|---|---|---|
| 2,780,596 | Anderson | Feb. 5, 1957 |
| 2,874,109 | Cooper | Feb. 17, 1959 |

OTHER REFERENCES

Apex–388, December 1956, "Reactor Fuse Propellants and Configurations," pages 3–21.

Apex–441 (NAS 13:4236) April 1955.

NAA–SR–2463, Apr. 1, 1958, "Hanfor Safety Device," page 15.

NAA–SR–3045, Oct. 1, 1958, "Safety Device Tests," page 5.

TID–2504 (Del), pages 319–322.